Patented Feb. 4, 1930

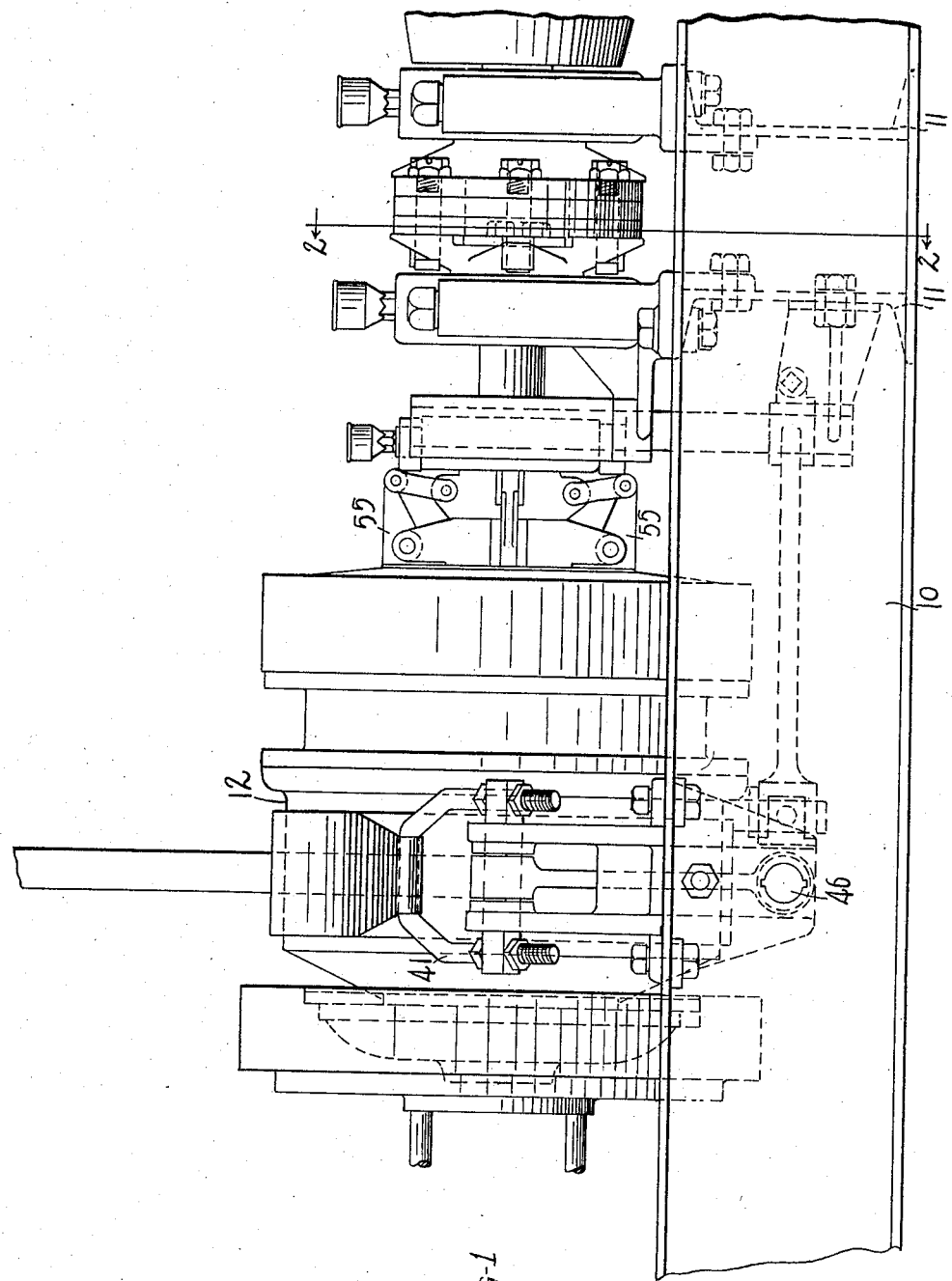

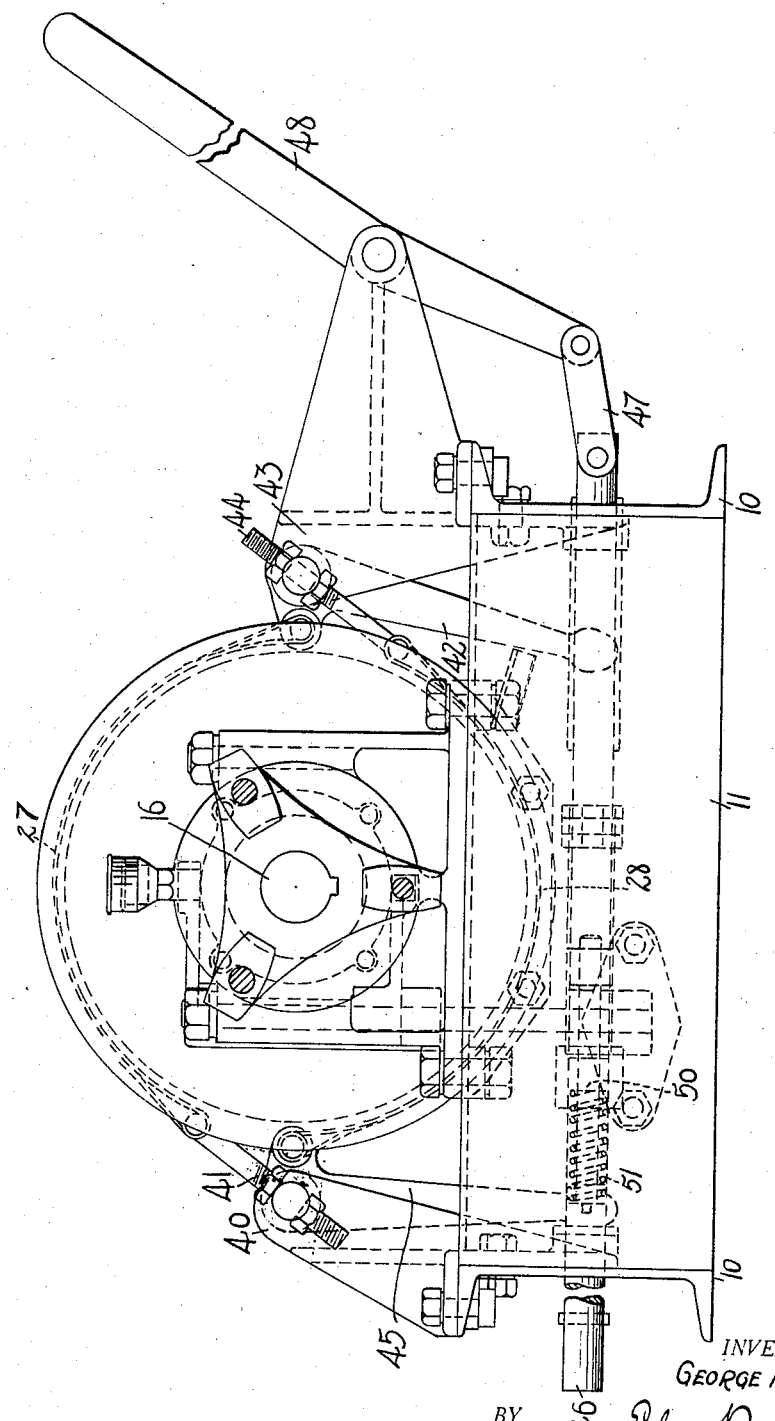

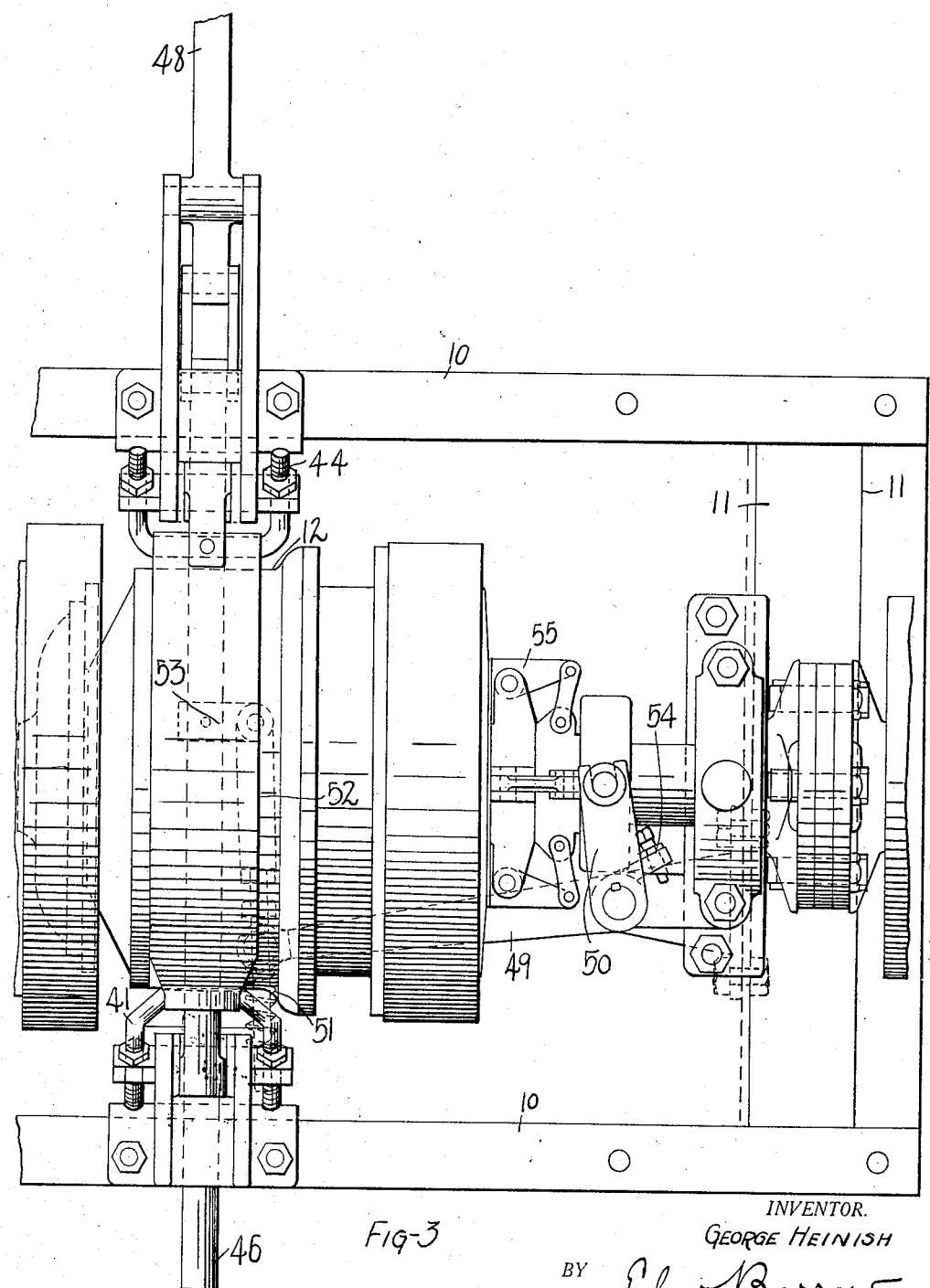

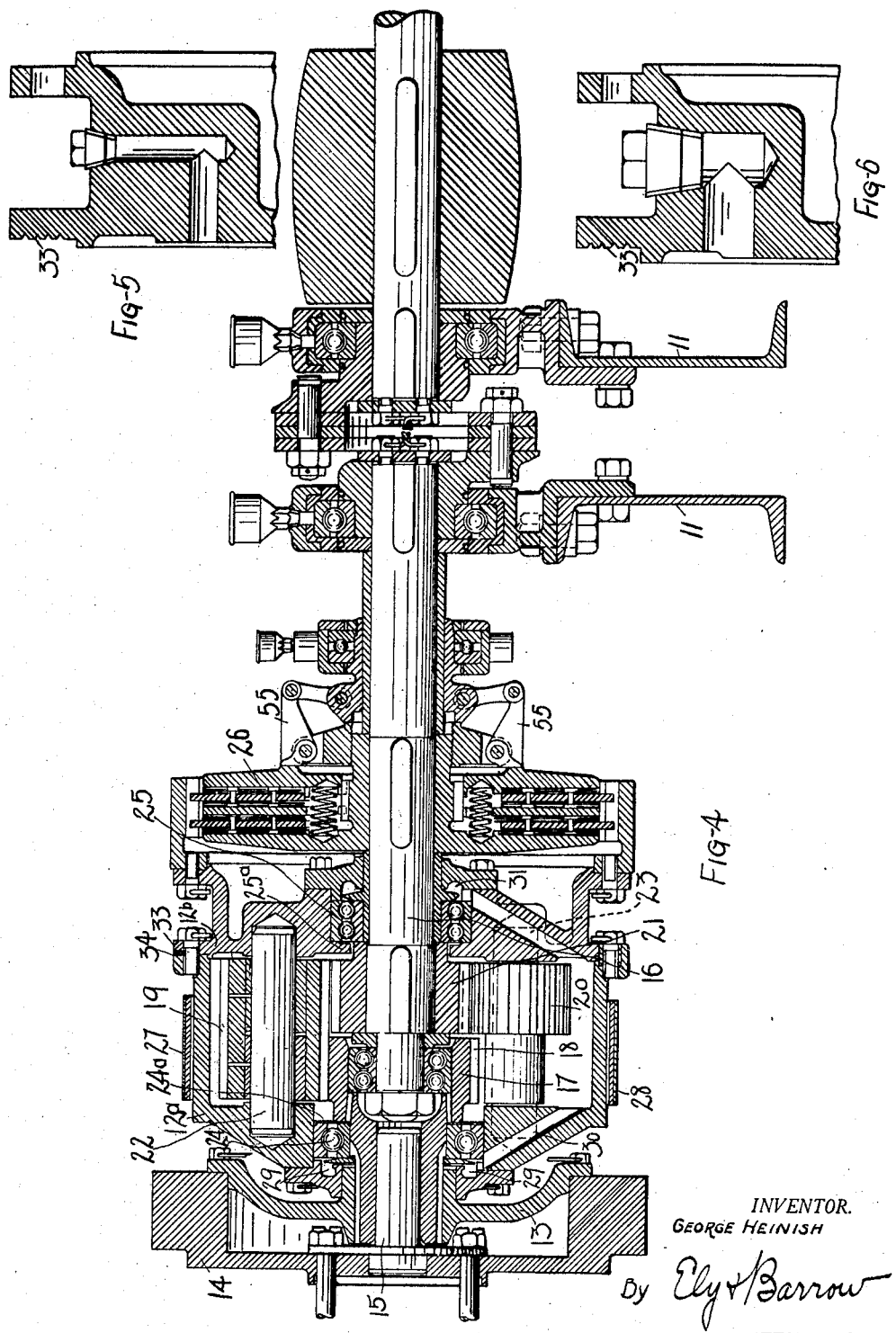

1,745,760

UNITED STATES PATENT OFFICE

GEORGE HEINISH, OF AKRON, OHIO, ASSIGNOR TO THE STAR DRILLING MACHINE COMPANY, OF AKRON, OHIO, A CORPORATION OF OHIO

TRANSMISSION

Application filed May 19, 1927. Serial No. 192,613.

This invention relates to transmissions, particularly of the planetary type.

The general purpose of the invention is to improve upon transmissions of this type by the provision of a more efficient lubricating system.

Heretofore planetary transmissions, such as reverse gears, have been objectionable in that they throw off a great deal of oil or other lubricant from the bearings and also from the joint between the casing parts, and it is the object of this invention to provide an improved lubricating system adapted to prevent throwing of oil.

The foregoing and other objects are obtained by the device illustrated in the accompanying drawings and described below, it being understood that the invention is not limited to the specific form thereof shown and described.

Of the accompanying drawings,

Figure 1 is a side elevation of a transmission embodying the invention;

Figure 2 is a section on line 2—2 of Figure 1;

Figure 3 is a plan thereof;

Figure 4 is a longitudinal, diametral section therethrough; and

Figures 5 and 6 are part radial sections through the casing showing oil level and oil filling and draining ports.

Referring to the drawings, the numerals 10, 10 indicate spaced, longitudinal channels and 11, 11 transverse channels connected thereto providing a support for a power unit including a transmission 12 of the planetary reverse gear type.

The transmission 12 includes a driving member 13 which may be connected to the fly wheel 14 of a motor (not shown), said member being mounted on a pilot shaft 15 driven by the motor and being journaled on a driven shaft 16 by bearing 17. Member 13 has a drive gear 18 thereon which is arranged to drive through reversing planet gears including those indicated at 19 and 20 in the usual way to a driven gear 21 mounted on shaft 16. The planet gears of the transmission are journaled upon studs, such as indicated at 22 and 23, mounted in casing 12, casing 12 being journaled upon member 13 by bearing 24 and on the driven shaft 16 by a bearing 25. A clutch 26 is provided to connect the transmission drum or casing 12 to shaft 16 and brake bands 27 and 28 are arranged to be engaged with casing or drum 12 to secure an increased speed in reverse through the planetary gearing contained within the casing.

In Figures 5 and 6, which are radial sections through one section 12$^b$ of casing 12, between the planet studs, there are shown ports for indicating the level of and admission of oil or other lubricant to or drainage of the same from casing 12. Bearing 24 has a baffle 24$^a$ arranged about it and about which oil can flow into and through the bearing. To prevent throwing of the oil from the bearing, an annular pocket is provided at 29 about the outer side thereof to receive the oil and radial ducts 30 are provided in casing 12 between studs 23 through which the oil from pocket 29 is forced back into the casing by centrifugal action.

The bearing 25 is arranged to be similarly lubricated, the construction of casing 12 about this bearing providing a baffle 25$^a$ so that a separate oil baffle need not be employed, the pocket 31 about the outer side of the bearing receiving the oil passing through the bearing and radial ducts in the casing 12 delivering the oil from pocket 31 back into the casing.

Throwing of oil from between the casing parts 12$^a$ and 12$^b$ is prevented by forming circumferential grooves, serrations or the like, as indicated at 33, on at least one of these parts or sections and bolting the parts together with a gasket 34 of compressible material disposed therebetween.

The operation of the lubricating system is as follows:

The oil in the casing is carried up by rotation of the casing and rotation of the gearing and is supplied to the inner ends of main bearings 24 and 25, flow of oil therein, however, being restricted by baffles 24$^a$ and 25$^a$ so that the amount of oil passing into the bearings is kept at a minimum whereby it is controllable against seepage out of the casing. The oil passes through the bearings and into pockets 29 and 31 from which it is redelivered to the casing by centrifugal force due to rotation of the casing, through radial passages such as 30.

The brake device employed to operate bands 27 and 28 is best seen in Figure 2. The top band 27 is connected at one end to brackets 40 on one side of the casing 12 by an adjustable U-bolt 41, the other end of this band being connected to a bell crank lever 42 pivoted on brackets 43 on the other side of the casing 12. The lower band 28 is connected at one end by an adjustable U-bolt 44 to brackets 43 and at the other end to a bell crank 45 pivoted on brackets 40. Bell cranks 42 and 45 are arranged to be simultaneously actuated to apply or release the bands by means of a reciprocable rod 46 slidably mounted on channels 10 and connected by a link 47 to an operating lever 48. The rod 46 is also employed for shifting the clutch, a clutch shifting arm 49 for operating the shifting yoke 50 being yieldingly connected by a spring 51 to a link 52 connected to rod 46 at 53. A stop device 54 is arranged on the clutch shifting device to limit its movement to released position and to cause the spring 51 to compress upon application of the brake bands. Toggle actuated pressure applying cams 55, 55 are employed in the clutch so that it will remain engaged when shifted into engagement by lever 48, the connection being such that a further movement of lever 48 after disengagement of the clutch will apply the brake bands 27 and 28 and, vice versa, a further movement of lever 48 after disengaging the bands 27 and 28 will engage the clutch.

It will appear from the foregoing that by the invention, oiling systems employed with planetary transmissions or reversing gears have been greatly improved. It will also be apparent that modifications of the invention may be resorted to without departing from the spirit thereof or the scope of the appended claims.

What is claimed is:—

1. A transmission of the planetary type, including a rotatable casing and planetary gearing contained therein, bearings for the casing constructed to permit a lubricant in the casing to pass outwardly therethrough, and baffles about the inner sides of the bearing to restrict such passage of lubricant, said casing having pockets therein about the outer sides of the bearings to receive the lubricant therefrom and also having one or more ducts therein extending from said pockets radially outwardly to deliver lubricant into the casing, whereby the lubricant passing through the bearings will be returned to the casing.

2. A transmission of the planetary type, including a rotatable casing and planetary gearing contained therein, and bearings for the casing constructed to permit a lubricant in the casing to pass outwardly therethrough, said casing having pockets therein about the outer sides of the bearings to receive the lubricant therefrom and also having one or more ducts therein extending from said pockets radially outwardly to deliver lubricant into the casing, whereby the lubricant passing through the bearings will be returned to the casing.

3. A transmission of the planetary type, including a rotatable casing and planetary gearing contained therein, bearings for the casing constructed to permit a lubricant in the casing to pass outwardly therethrough, and baffles about the inner sides of the bearing to restrict such passage of lubricant, said casing having one or more ducts therein extending from the outer side of the bearings radially outwardly to deliver the lubricant back into the casing.

4. A transmission of the planetary type, including a rotatable casing and planetary gearing contained therein, and bearings for the casing constructed to permit a lubricant in the casing to pass outwardly therethrough, said casing having one or more ducts therein extending from the outer side of the bearings radially outwardly to deliver the lubricant back into the casing.

5. A transmission of the planetary type, including a rotary casing, bearings for the casing, said bearings being constructed so that a lubricant in the casing may pass outwardly therethrough, and means for returning the oil passing through the bearings back into the casing.

6. A transmission of the planetary type, including a rotatable casing and planetary gearing contained therein, and bearings for the casing constructed to permit a lubricant in the casing to pass outwardly therethrough, said casing having pockets at the outer ends of the bearings for receiving oil therefrom and having one or more ducts therein extending from the pockets radially outwardly to deliver the lubricant back into the casing.

7. A transmission of the planetary type, including a rotary casing, a bearing for the casing adapted to be lubricated by oil contained in the casing, and means for preventing throwing of oil from the bearing comprising a baffle for restricting flow of oil into the bearing, a pocket for receiving oil from the outer end of the bearing, said casing having one or more radial passages for delivering oil from the pocket back into the casing by centrifugal force.

8. A transmission of the planetary type, including a rotary casing, a bearing for the casing adapted to be lubricated by oil contained in the casing, and means for preventing throwing of oil from the bearing comprising a baffle for restricting flow of oil into the bearing.

9. A transmission of the planetary type, including a rotary casing, a bearing for the casing adapted to be lubricated by oil contained in the casing and means for preventing throwing of oil from the bearing comprising a pocket for receiving oil from the outer end of the bearing, said casing having one or more radial passages for delivering oil from the pocket back into the casing by centrifugal force.

10. A transmission of the planetary type, including a rotary casing, a bearing for the casing adapted to be lubricated by oil contained in the casing, and means for preventing throwing of oil from the bearing comprising means for returning oil from the outer end of the bearing back into the casing.

11. A transmission of the planetary type, including a rotary casing, a bearing for the casing adapted to be lubricated by oil contained in the casing, and means for preventing throwing of oil from the bearing comprising a baffle for restricting flow of oil into the bearing, and means for returning oil from the outer end of the bearing back into the casing.

GEORGE HEINISH.